March 5, 1963 J. N. MILLER 3,079,952
VALVE
Filed Dec. 28, 1959 2 Sheets-Sheet 1
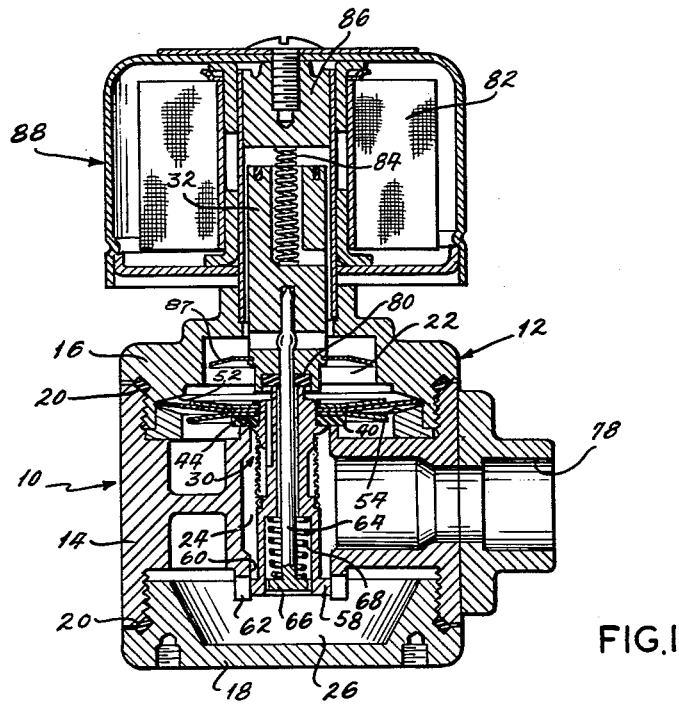
FIG. 1
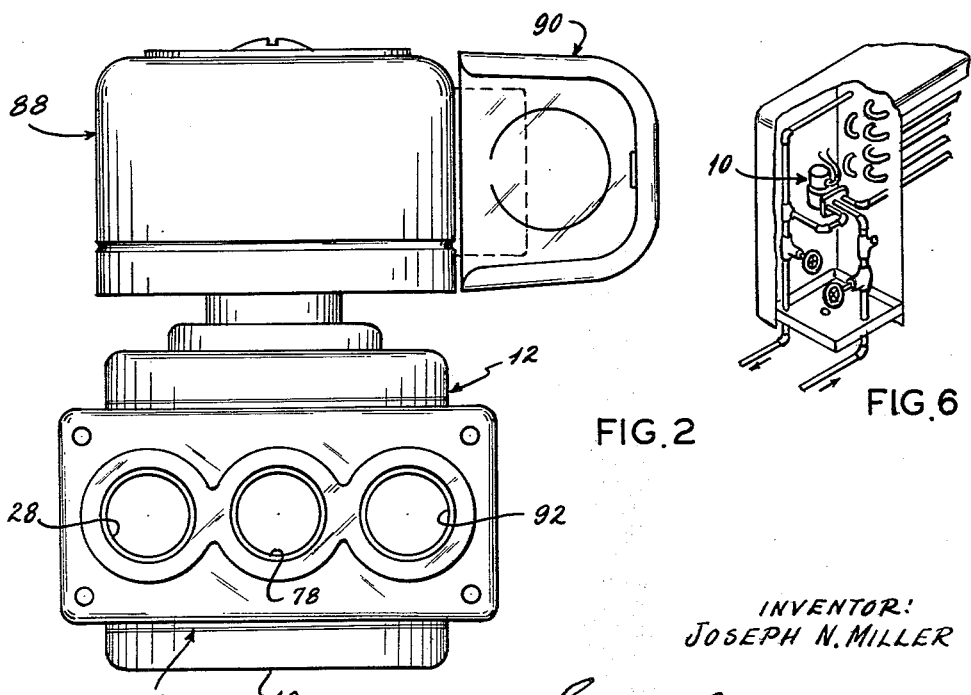
FIG. 2
FIG. 6
INVENTOR:
JOSEPH N. MILLER
BY Gravely, Lieder & Woodruff
ATTORNEYS.

March 5, 1963  J. N. MILLER  3,079,952
VALVE
Filed Dec. 28, 1959  2 Sheets-Sheet 2
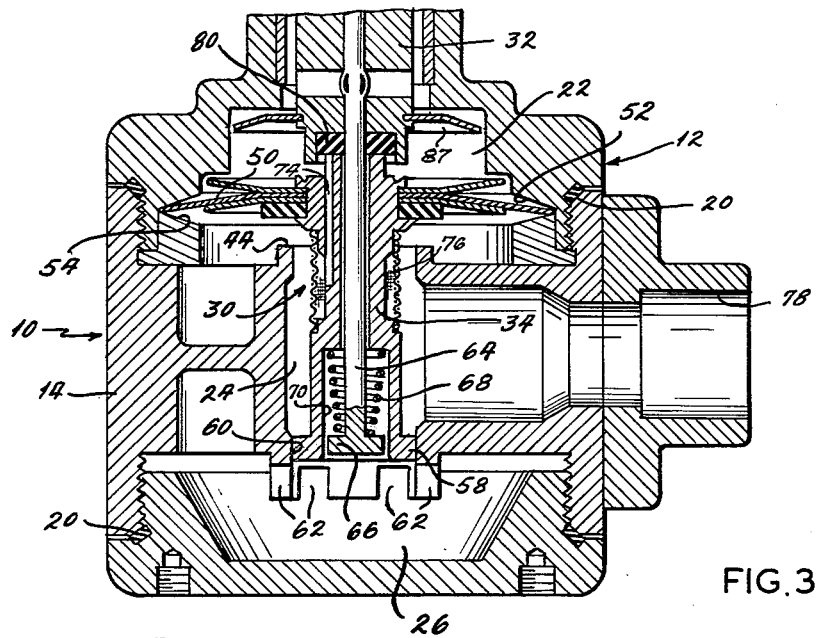
FIG. 3
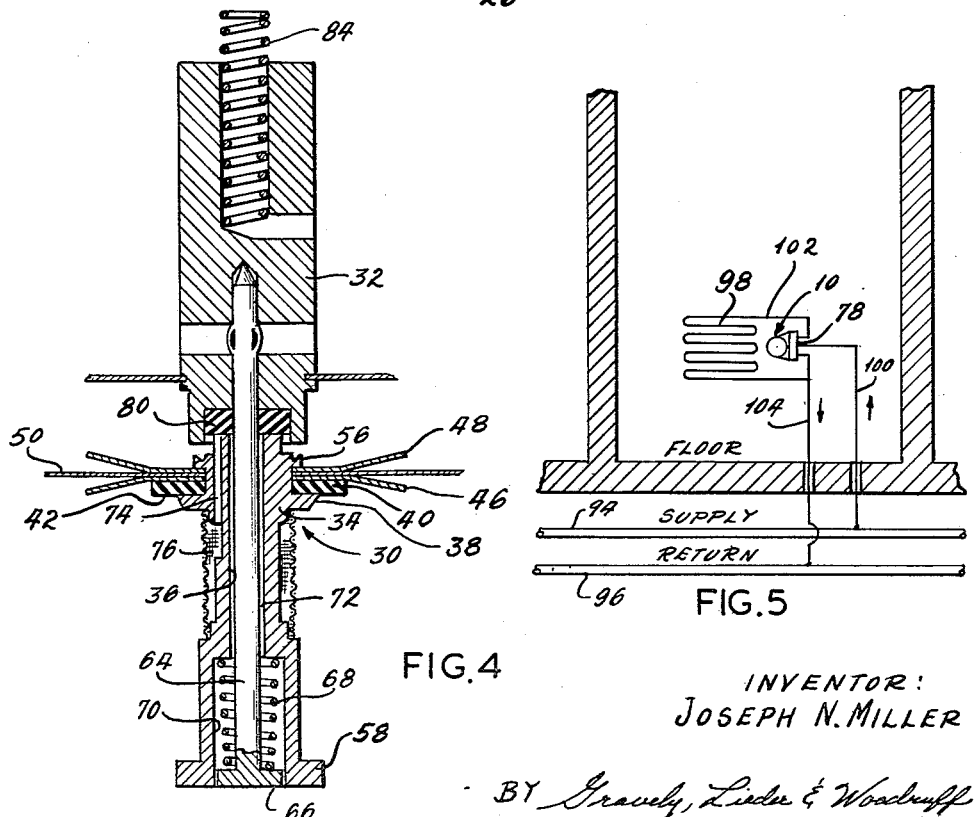
FIG. 4
FIG. 5
INVENTOR:
JOSEPH N. MILLER
BY Gravely, Lieder & Woodruff
ATTORNEYS.

United States Patent Office 3,079,952
Patented Mar. 5, 1963

3,079,952
VALVE
Joseph N. Miller, Overland, Mo., assignor to Jackes-Evans Manufacturing Company, St. Louis, Mo., a corporation of Missouri
Filed Dec. 28, 1959, Ser. No. 862,388
11 Claims. (Cl. 137—625.49)

The present invention relates generally to valves and more specifically to a solenoid valve with means for three way operation.

Various devices are known for controlling flow particularly of hot or chilled water in heating and cooling units. The known devices, however, are unsatisfactory for one or more reasons such as, for example, they may cause water damage due to condensation forming, they may permit convective over heating when used with heating units, they may not maintain the desired water temperature at the controlled unit, and they are usually noisy due to pressure fluctuations which cause hammering. These and other disadvantage of the known device are overcome by the present device which is a three way solenoid valve adapted to be used in systems such a heating and cooling systems. The present valve comprises a housing with an inlet and two outlets, and valve means controlling communication between the inlet and said outlets, said valve means including an amplifier member, and solenoid means for controlling the operation of the valve means.

A principal object of the present invention is to provide a valve for use with hot and cold water systems.

Another object is to provide a three way solenoid controlled valve with an amplifier member relatively freely positioned therein.

Another object is to provide a valve structure suitable for controlling both heating and cooling operations.

Another object is to eliminate noise and vibration in heating and cooling systems.

Another object is to provide a relatively inexpensive, efficient and trouble free valve for heating and cooling systems.

Another object is to provide a three way valve that is easy to install in new as well as existing systems and which can be accommodated in relatively small space.

Another object is to provide a valve capable of handling a wide range of flow capacities over a wide range of pressures.

These and other objects and advantages of the present device will be apparent after considering the following detailed specification of a preferred embodiment in conjunction with the accompanying drawings.

In the drawings:

FIG. 1 is a cross-sectional elevational view through the center of a valve constructed according to the present invention, the valve being shown in deenergized condition;

FIG. 2 is a side elevational view of the valve as seen from the right in FIG. 1;

FIG. 3 is a fragmentary cross-sectional elevational view similar to FIG. 1 showing the valve in energized condition;

FIG. 4 is an enlarged cross-sectional view of the amplifier member and associated solenoid armature for the present valve;

FIG. 5 is a diagrammatic view of a typical system employing the present valve; and FIG. 6 is a fragmentary diagrammatic view showing the details of a typical installation employing the present valve.

Referring to the drawings more in detail, the number 10 refers to a solenoid operated three-way valve constructed according to the present invention. The valve 10 has a body assembly 12 which includes a central body member 14 and threadedly connected upper and lower body members 16 and 18 respectively. The body members 16 and 18 are sealably engaged with the central body member 14 by suitable means such as O rings 20. The body members 14, 16 and 18 form three chambers 22, 24 and 26 in the body assembly 12. The lower chamber 26 is referred to as the by-pass chamber or cavity and it communicates with an outlet port 28 (FIG. 2). The upper and middle chambers 22 and 24 position an amplifier member 30 and the lower end portion of a solenoid armature 32 attached thereto. The details of the amplifier member 30 and the armature 32 are shown in greater detail in FIG. 4.

The amplifier member 30 has a stem portion 34 with a bore 36 therethrough. An annular plate-like portion 38 is formed on the stem 34 adjacent to the upper end and an annular resilient valve member 40 is positioned adjacent to the plate-like portion 38 and has an annular downwardly facing surface 42 which cooperates with a valve seat 44 on the central body member 14 when the valve 10 is deenergized as will be described later.

Immediately adjacent to the upper surface of the valve member 40 is positioned on annular disc 46 with a downwardly tapering annular outer portion. A similar annular disc 48 only with an upwardly tapered outer portion is positioned on the stem 34 above the disc 46, and an annular flexible diaphragm 50 is positioned between the discs 46 and 48 and extends beyond the edges thereof for cooperation with opposed annular tapered shoulders 52 and 54 formed adjacent to the periphery of the upper chamber 22. The members 40, 46, 58 and 50 are held on the stem 34 by staking the upper end thereof at 56 (FIG. 4).

The stem portion 34 of the amplifier member 30 extends downwardly (FIGS. 1 and 3) through the central chamber 24 and has an annular flange 58 adjacent to the lower end thereof which is slidable in a cylindrical bore portion 60 of the central chamber 24. The cylindrical bore 60 extends between the central chamber 24 and the lower chamber 26 and has a plurality of spaced notches or cut outs 62 formed therein which cooperate with the flange 58 and provide communication between the chambers 24 and 26 under certain conditions which will be described later.

The bore 36 in the stem 34 positions a plunger 64 which is of smaller diameter than the bore 36. The plunger 64 has an enlarged flanged portion 66 at the lower end thereof against which is seated the lower end of a compressing spring 68. The compression spring 68 extends around the plunger 64 and is positioned in a bore 70 in the lower end of the stem 34. The upper end of the spring 68 seats against the top of the bore 70. The flange 66 is smaller in diameter than the bore 70 to provide flow passage thereby.

The plunger 64 is smaller in diameter than the bore 36 and therefore forms an annular passage 72 therewith which is referred to as the pilot port 72. The size or cross-sectional area of the pilot port 72 is important to the operation of the valve as will be shown.

Another passage 74 is provided through the upper portion of the amplifier member 30 (FIG. 4) and is referred to as the equalizer orifice 74. The equalizer orifice 74 has a smaller cross-sectional area than the pilot port 72, and provides limited flow communication between the chambers 22 and 24 past the diaphragm 50. The equalizer orifice 74 is relatively small in cross-sectional area and therefore relatively easily plugged by dirt or other foreign matter. Therefore, a screen 76 is mounted around the stem 34 and encloses a space surrounding the lower entrance thereto. This is done to prevent foreign matter carried by the incoming fluid through inlet port 78 from plugging the orifice 74.

The upper end of the plunger 64 is connected to the solenoid armature 32 by any known means and is controlled thereby. The armature 32 carries a resilient valve member 80 adjacent its lower end which cooperates with the upper end of the stem 34 to close the pilot port 72 when the valve is deenergized (FIGS. 1 and 4). The armature 32 extends upwardly into a space surrounded by solenoid coil 82. A spring 84 is positioned extending upwardly in a bore in the armature 32 and cooperates with a backstop member 86 in the solenoid portion enabling the armature to readily overcome any residual magnetism retained in the members and to be operated more readily in other than an upright position. The spring 84 also reduces noise. An annular disc 87 is carried by the armature 32 in the upper chamber 22 and serves as a dashpot to dampen the movement of the armature and associated members. If the valve 10 is used in a water system which is a contemplated use therefor the upper portions including the space surrounding the armature 32 will be filled with water and the member 87 will have a considerable dampening effect.

The solenoid coil 82 and the associated parts are mounted in a suitable housing 88 which is provided with a junction housing 90 wherein connections are made between the solenoid coil 82 and suitable external control circuits.

A second valve outlet port 92 (FIG. 2) is also provided in the body assembly 12. The port 92 communicates directly with the portion of the upper chamber 22 below the diaphragm 50. When the valve is deenergized as shown in FIG. 1, the inlet port 78 communicates with the by-pass outlet port 28 through the cut outs 62 in the bottom of the stem 34, and is prevented from communicating with the outlet port 92 by engagement between the valve member 40 and the valve seat 44. Also the inlet port 78 is prevented from full communication with the chamber 22 above the diaphragm 50 (except through the equalizer orifice 74) by the sealing cooperation between the member 80 and the upper surface of the stem 34.

*Operation*

One application for the present valve is in a heating and cooling system which is thermostatically controlled in a conventional manner. When the thermostat calls for cooling (or heating, if hot water is supplied), the solenoid coil 82 is energized, opening the pilot port 72 by magnetically lifting the armature 32. Prior to being energized the space in the upper valve chamber 22 above the diaphragm 50 is at the same pressure as the inlet pressure because of the action of the equalizer orifice 74 which provides limited communication therebetween. However, when the valve is energized the amplifier member 30 moves upwardly, because the pressure in the upper chamber 22 above the diaphragm 50 is bled off faster through the pilot port 72 than the orifice 74 can resupply pressure from the inlet. This is so because the pilot port 72 has greater capacity than the orifice 74 and further because the pilot port 72 is in communication with the lower chamber 26 and the return line at all times. Therefore, opening the pilot port 72 establishes a pressure differential across the diaphragm by applying the input pressure to the lower side thereof and bleeding off the pressure thereabove which causes the amplifier member 30 to move upwardly to its open position (FIG. 3). The stem 34 which is part of the amplifier member 30 also moves upwardly and eventually shuts off communication through the cut outs 62 and hence destroys the communication between the chambers 24 and 26. Simultaneously the main valve port which is through the valve seat 44 opens and establishes substantially unrestricted communication between the inlet port 78 and the outlet port 92.

In FIG. 5 is shown a diagrammatic view of the present valve 10 connected into a system having supply and return pipes 94 and 96 respectively, and a heat exchange coil 98 of a fan unit. The installation of the valve in such a system is shown more in detail in FIG. 6.

Referring again to FIG. 5, when the valve 10 is energized as described above the supply liquid from supply pipe 94 is fed through a conduit 100 to the inlet port 78 of the valve 10. From there it passes into the valve chamber 24, through the main port as defined by the seat 44 to the valve chamber 22 below the diaphragm 50, to the outlet port 92, and from there through a conduit 102 to and through the heat exchange coil 98 and back through a conduit 104 to the return pipe 96. In the energized condition heating (or cooling) takes place and continues until the room thermostat (not shown) that controls the energizing of the solenoid coil 82 indicates the desired room temperature is reached at which time the valve is again deenergized and returns to the deenergized condition shown in FIG. 1.

In the deenergized condition the supply pipe 94 feeds the hot (or cold) water through the conduit 100 to the inlet port 78, to the chamber 24, then down, instead of up, through the cut outs 62 which are open when the valve is deenergized, to the chamber 26 and back to the by-pass outlet 28 and the conduit 104 to the return pipe 96.

When the valve 10 is installed in a system where very little differential pressure is available for operating the amplifier member 30, the lifting action of the armature 32 is aided by the compression spring 68. The spring 68 acts to lift the stem 34 and close the passages formed by the cut outs 62 and also helps to open the main port.

When the valve is deenergized and the armature moves down, the pilot port 72 closes and allows pressure to again build up above the diaphragm 50 through the equalizer orifice 74. This allows the amplifier member 30 and the diaphragm 50 to move to the deenergized position closing the main port 44 and opening the by-pass ports through the cut outs 62. This shuts off flow through the fan coils 98 and by-passes the supply pressure to the return pipe 96 as described above.

Thus there has been shown and described a valve and a system therefor which fulfill all of the objects and advantages sought therefor. Many changes, modifications and variations of the valve and of the system shown could be made and will be readily apparent to those skilled in the art after considering this specification and the accompanying drawings. All such changes, modifications and variations which do not depart from the spirit and scope of the invention are deemed covered by the invention which is limited only by the claims which follow.

What is claimed is:

1. A valve comprising a housing having an upper, an intermediate, and a lower chamber therein, and inlet port communicating with the intermediate chamber and an outlet port communicating with each of said upper and said lower chambers, first valve means positioned between the upper and intermediate chambers and second valve means positioned between the intermediate and lower chambers, said first valve means including a valve seat associated with one of said associated chambers, and solenoid means for controlling the operation of said first and said second valve means including an amplifier member positioned in at least one of said chambers and cooperating with said valve seat, said amplifier member having a stem portion with a port therethrough, and a flexible diaphragm mounted on the stem portion in said upper chamber and extending outwardly therefrom to a free outer edge adjacent to the periphery of said upper chamber, said valve control means being movable between a deactuated position cooperating with the valve seat associated with the first valve means to cut off communication between the upper and intermediate chambers and an actuated position releasing the amplifier member and enabling the amplifier member to move out of engagement with said valve seat in response to the presence of a preselected pressure differences on opposite sides of the diaphragm, said second valve means being located on said amplifier member and moving between an open position when the valve control means are de-actuated and a closed position when the valve control means are actuated.

2. A pilot operated valve comprising a housing having an inlet chamber and first and second outlet chambers located on opposite sides thereof, and valve means controlling communication between said inlet chamber and said first and second outlet chambers, said valve means including a movable member having a passage therethrough extending between the first and second outlet chambers, first valve means positioned to control communication through said passage, main valve means carried on said movable member for controlling communication between the inlet chamber and said first outlet chamber, second valve means carried on said movable member for controlling communication between the inlet chamber and said second outlet chamber, a diaphragm carried on said movable member in said first outlet chamber and extending outwardly therefrom to adjacent the wall of the chamber for dividing said chamber into separate chamber portions, and an orifice through said movable member providing limited communication between said last named separate chamber portions.

3. The pilot operated valve defined in claim 2 wherein said first valve means includes a plunger member movably positioned in said passage in the movable member and means carried by said plunger member normally biasing said first valve means into a position closing the passage through the movable member.

4. The pilot operated valve defined in claim 3 wherein said means carried by the plunger member includes compression spring means positioned between said plunger member and said movable member.

5. In a system for heating or cooling including a source of fluid, supply and return conduit means for said source, a cooling and heating device capable of utilizing the fluid from the source for cooling or heating, thermostat means for alternately directing said source of fluid either to the cooling or heating device or by-passing said source to the return conduit means, the improvement comprising pilot operated valve means including a housing having an inlet chamber adapted to be connected to the supply conduit means, a first outlet chamber adapted to be connected to the cooling or heating device, and a second outlet chamber adapted to be connected to said return conduit means, a movable member positioned in said housing and extending between said inlet and outlet chambers and having a passage therethrough extending between the first and second outlet chambers, means operatively connected to the movable member for controlling the opening and closing of said passage, a first valve carried on said movable member for controlling communication between the inlet chamber and the first outlet chamber, a second valve carried by said movable member for controlling communication between said inlet chamber and said second outlet chamber, a flexible diaphragm sealably mounted on the movable member and extending outwardly therefrom for engagement with the wall of the first outlet chamber to divide said chamber into separate chamber portions, and an orifice through said movable member providing limited communication between the separate chamber portions on opposite sides of said diaphragm.

6. In a three-way valve having a housing with a chamber therein, an inlet, and first and second outlets communicating with the chamber at spaced locations, and a main valve seat positioned between said inlet and said first outlet, an amplifier member positioned in the chamber and extending between the inlet and the outlets for controlling communication therebetween, said amplifier member having a body portion with an elongated bore extending therethrough, a second valve seat associated with said bore, said bore having one end communicating with the second outlet and an opposite end communicating with the second valve seat, a flexible disc mounted on said body portion and extending outwardly therefrom to an unattached marginal edge portion engageable with the chamber wall to form distinct chamber portions on opposite sides thereof, a valve member carried on said body portion in position to cooperate with said main valve seat for cotnrolling communication between the inlet and the first outlet, secondary valve means on said amplifier slidably cooperating with the valve chamber between the inlet and second outlet to control communication therebetween, said secondary valve means being open when the valve member is engaged with the main valve seat, a plunger member positioned in the body bore and having a smaller cross sectional area than the bore to form a passage therebetween through the bore, a valve carried on said plunger member in position to cooperate with said second valve seat for controlling communication through said passage, and an orifice through the body portion of said amplifier member providing limited flow communication between the valve inlet and one of said distinct chamber portions, said orifice having a more restricted flow capacity than said passage.

7. A three-way valve comprising a housing having a chamber formed therein, an inlet and first and second outlets to said chamber, first valve means positioned between said inlet and said first outlet and second valve means positioned between said inlet and said second outlet, movable means connecting said first and said second valve means for effecting simultaneous operation thereof to open one of said valve means while closing the other of said valve means, said movable valve connecting means including a tubular member having a passage therethrough one end of which is associated with said second outlet, a plunger member of smaller cross section than the passage extending substantially through the passage in the tubular member and having normally closed valve means thereon for cooperating with the tubular member to control communication through said passage, a flexible diaphragm mounted on said tubular member and extending outwardly therefrom to a free marginal edge in engagement with said houisng chamber dividing said chamber into separate chamber portions one of which is associated with the opposite end of the passage in the tubular member, a by-pass passage of limited flow capacity through the tubular member communicating the inlet to the chamber with the separate chamber portion on the opposite side of the diaphragm from said inlet, and operator means connected to the plunger member for controlling the position thereof in the tubular member and the communication through said passage whereby the pressure in the separate chamber portions formed by the diaphragm affects the position of the movable valve connecting means and therefore also the extent of communication between the inlet and said first or second outlets.

8. A valve comprising a housing having first, second and third chambers therein, an inlet port to said first chamber, and an outlet port to each of said second and third chambers respectively, primary valve means including a main valve seat positioned between said first and said second chambers, and secondary valve means positioned between said first and said third chambers, means connecting said primary and said secondary valve means, and a movable valve operating member connected to said valve means and movable between different pre-selected positions for controlling communication between the inlet port and said outlet ports, said means connecting said primary and secondary valve means including an amplifier member adapted to cooperate with said main valve seat to control communication therethrough, said amplifier member having a hub portion with a pilot port therethrough that extends between said second and third chambers, means on said movable valve operating member for controlling communication through said pilot port, and a flexible diaphragm mounted on said hub portion in the second chamber and extending outwardly from said hub portion to adjacent the periphery of said second chamber, a passage of more limited flow capacity than the pilot port extending through the hub portion of the amplifier member between said first chamber and the second chamber on one side of the diaphragm, said movable valve operating member cooperatively engaging said amplifying member during movement thereof to move said amplifier member between a deactuated position in which said amplifier member cooperates with and closes said main valve seat and an actuated position in which said amplifier member is free to move out of cooperative engagement with said main valve seat.

9. In a three-way solenoid operated valve having a housing with a chamber therein and an inlet and first and second outlets into said chamber, the improvement comprising an amplifier member positioned in said chamber and including connected and movable first and second valve means associated therewith, said first valve means being positioned between the inlet and the first outlet, and said second valve means being positioned between said inlet and said second outlet, a diaphragm mounted on said amplifier member and extending outwardly therefrom for unattached but sealing engagement with the housing chamber to divide the housing chamber into separate chamber portions on opposite sides thereof, first and second passages through the amplifier member, said first passage extending between the inlet and one of said separate chamber portions, and said second passage extending between the same one of said chamber portions and one of said outlets, one of said passages being smaller in cross-sectional area than the other, a control valve associated with the larger area passage, said control valve having a plunger portion that extends into said associated passage, said plunger portion having a smaller area cross section than the area cross section of the passage to provide space therearound in the passage, said space having a greater cross section than the cross section of the smaller passage.

10. In a pilot operated valve having a housing with three chambers formed therein, an inlet port communicating with one of said chambers and an outlet port communicating respectively with each of the other two chambers, the improvement comprising an amplifier member having a central body portion movably positioned in said valve chambers and having a pilot port extending therethrough between said two outlet chambers, first valve means associated with said pilot port and movable between positions opening or closing said pilot port, operator means connected to said first valve means for controlling communication through the pilot port second valve means on said amplifier member controlling communication between the inlet chamber and one of said two outlet chambers, third valve means on said amplifier member controlling communication between said inlet chamber and the other of said two outlet chambers, a flexible diaphragm mounted on said central body portion in one of said two outlet chambers for dividing said outlet chamber into separate chamber portions, said diaphragm having a sealing attachment to the central body portion and extending outwardly therefrom to an unattached marginal edge that sealably engages the wall of the associated outlet chamber, and a by-pass passage of limited flow capacity through the body portion of the amplifier member, said by-pass passage communicating the inlet chamber with the said one outlet chamber on one side of the said diaphragm.

11. In a valve having an inlet, a pair of spaced outlets, and a chamber with a pair of opposed spaced periphery shoulders, a valve associated with each of said outlets; and an amplifier member positioned within the chamber and movable therein between an open position opening the valve associated with one of said outlets and a closed position closing said valve and opening the valve associated with the other outlet, said amplifier member including a support portion that extends to adjacent said inlet and outlets and has a pilot port therethrough that extends between said pair of spaced outlets, a flexible diaphrgam mounted on the support portion and extending outwardly therefrom and terminating in a marginal portion positioned between the opposed peripheral chamber shoulders, a passage of more limited flow capacity than the pilot port extending through the support portion of the amplifier member communicating said inlet with the chamber on the opposite side of the diaphragm from said inlet and means operatively connected to the amplifier member for controlling the movement thereof, said last named means including solenoid means and resilient spring means for dampening the movement imparted to the amplifier member by operation of the solenoid means.

References Cited in the file of this patent
UNITED STATES PATENTS

| | | |
|---|---|---|
| 2,319,578 | Beekley | May 18, 1943 |
| 2,413,622 | Harding | Dec. 31, 1946 |
| 2,621,885 | Schmitt | Dec. 16, 1952 |
| 2,738,157 | Nargo | Mar. 13, 1956 |
| 2,765,628 | Anthony | Oct. 9, 1956 |
| 2,870,986 | Vargo | Jan. 27, 1959 |